May 20, 1924.

W. RAHE

MOTOR VEHICLE BUMPER

Filed Sept. 8, 1923    2 Sheets-Sheet 1

Inventor.
William Rahe
By Clarence Perdew
Attorney.

May 20, 1924.

W. RAHE

MOTOR VEHICLE BUMPER

Filed Sept. 8, 1923

Inventor
William Rahe
By Clarence Perdew
Attorney.

Patented May 20, 1924.

1,494,867

UNITED STATES PATENT OFFICE.

WILLIAM RAHE, OF NEWTOWN, OHIO.

MOTOR-VEHICLE BUMPER.

Application filed September 8, 1923. Serial No. 661,634.

*To all whom it may concern:*

Be it known that I, WILLIAM RAHE, a citizen of the United States, residing at Newtown, in the county of Hamilton and State of Ohio, have invented certain new and useful Improvements in Motor-Vehicle Bumpers, of which the following is a specification.

My invention relates to fenders or buffers or bumpers for receiving impacts on vehicles, and its objects are to provide for lightness and economy in construction, to afford a high degree of resiliency, to receive and transmit the impacts so that these will be partly absorbed by the springs of the vehicle, to obviate undue distortion of the bumper parts by disposing them to the best advantage relatively to the direction of transmission of the impacts, and to provide for firm attachment of the bumper to the vehicle by very simple means which is readily installed by relatively unskilled persons. Other objects will appear in the course of the ensuing description.

I attain these objects by the device illustrated, for example, in the accompanying drawings, in which—

Figure 1:
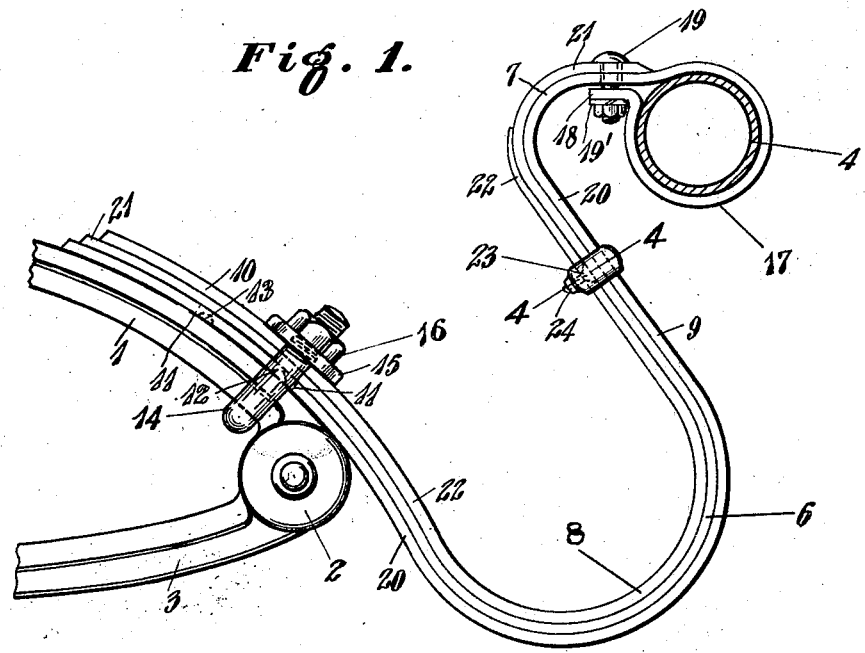
Figure 1 is a sectional side elevation of the device.

For the purpose of illustrating the use of my invention, part of the front of a motor vehicle is illustrated, comprising the two chassis frame bars 1 curving down and having pivotal connections 2 with the front ends of the front vehicle springs 3. It will be understood, however, that my improved bumper may be used on the rear end of the vehicle where the chassis bars extend out rearwardly and curve down to their attachments to the rear vehicle springs.

The transverse member of the bumper is here illustrated as a tube or pipe 4 having caps 5 on its ends and being circular in cross-section. This member 4 may be of the required length to intercept a colliding object anywhere across the front of the vehicle, as is well known in various types of bumpers.

This member 4 has two supports 6, attached to respective ones of the chassis members 1 and so constructed and arranged as to yield individually or collectively to impact received by the transverse member 4, and to have some up and down extent so as to receive directly impacts coming below the transverse member 4, as for instance another member similarly disposed across another vehicle with which collision is imminent.

Each support 6, as shown in Fig. 1, is bent into two loops 7 and 8, the first loop 7, much smaller than the other, being adjacent to the member 4 and preferably meeting that member substantially at a tangent and having its opening downward and outward from the vehicle toward the member 4; and the other loop 8 being approximately semi-circular and having its opening upward and inward toward the vehicle, with the outer end of this loop 8 joining the inner end of the smaller upper loop 7 through a substantially straight stretch 9 which joins the respective loops substantially tangentially thereto. The rear end of the lower large loop 8 joins an extension 10 which has a general direction upward and inward toward the vehicle, but is curved downward on a relatively large radius from near the large loop 8 substantially to the end of the support.

Figure 5:
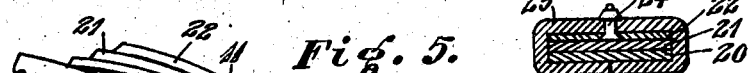
Fig. 5 is a partial side elevation corresponding to Fig. 1, showing an intermediate stage of the process of attachment of the bumper to the vehicle.

This terminal extension 10 is adapted to lie on top of the respective vehicle chassis frame bar 1 from the pivot 2 thereof for some distance inward therealong, with the inner end or junction of the loop 8 some distance downward and forward from this pivot 2. The downward curvature of this extension 10 is on a smaller radius than that of the chassis frame bar 1, so that the two parts come together somewhat as shown in Fig. 5. The support extension 10 has in its lower side the elongated recess 11 which fits around the heads 12 and 13 of the rivets or bolts forming part of the connection of the spring 3 to the bar 1, when the extension 10 is flexed to conform substantially with the curvature of the chassis bar 1 by means of the clamp made up of the U-bolt 14 straddling the chassis frame bar 1 with its transverse part under the bar 1 near the pivot 2 and the legs of this bolt 14 projecting upward and outward and embraced by a yoke 15 lying across the top of the extension 10, with nuts 16 screwed on the legs down against the yoke 15. This tightened condition is seen clearly in Fig. 1.

The attachment of the support 6 to the transverse member 4 is effected by forming an eye 17 integral with the outer end of the upper small loop 7; this eye 17 embracing the member 4 and terminating up inside the small loop 7 in a lip 18 which extends in substantially parallel with the outer end of the loop 7 near its junction with the eye 17. A bolt 19 down through this part of the loop 7 and through the lip 18 draws these parts together, contracting the eye 17 tightly around the member 4 at whatever location along this member it is required to make the connection, which location may vary in accordance with the widths of different vehicles to which the bumper may be applied.

Figure 4:
Fig. 4 is a cross-section on the plane of the line 4—4 of Fig. 1.

I prefer to make up the support 6, having the loops and inner end extension as before described, of a plurality of leaves. As herein shown, there are three such leaves. The leaf 20 lies next to the chassis bar 1 having a slot to form the recess 11, and, at the outer end of the support, this leaf 20 is continued to form the eye 17 as above described. The second leaf 21 overlies the first leaf 20 from near the inner end thereof, around both loops 8 and 7, out to the junction of the eye 17 with the main part of the first leaf 20. The bolt 19 extends through this end part of the second leaf 21 as well as through the first leaf 20 and the lip 18. The third leaf 22 overlies the second leaf 21 from near its inner end, around the larger loop 8, out to the inner side of the small loop 7, curving partly therearound and preferably being gradually thinner from the large loop 8 to this end. To hold these three leaves 20, 21 and 22 together yet allow them to slide on each other out near this end of the leaf 22, a clip 23 embraces the three leaves about midway of the length of the straight stretch 9 of the support and is secured to the third leaf 22 by a small bolt 24; being unattached to the first and second leaves 20 and 21. This arrangement is clearly shown in Fig. 4.

Figure 6:
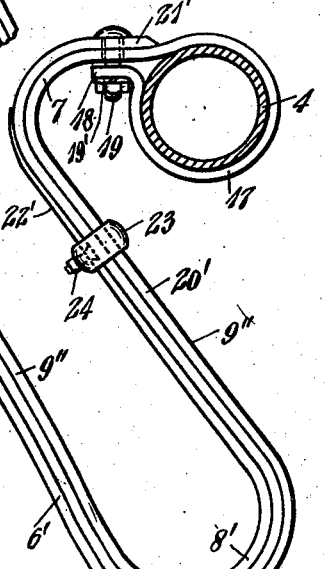
Fig. 6 is a sectional side elevation corresponding to Fig. 1, showing a modification of my invention.

In the modification shown in Fig. 6, the attachment of the support 6' to the transverse member 4 is like that of the example just described; but the support has in addition to the small loop 7 the two alternating loops 8' and 8''. The loop 8' joining the small loop 7 is similar to the loop 8 of the previous example in that it has its opening upwardly; but it is on a much smaller radius and the relatively straight stretch 9' joining it with the small loop 7 is much longer than in that example. The third loop 8'' is at the upper inner end of a second relatively straight or slightly curved stretch 9'' joining the inner end of the second loop 8'; and this third loop 8'' has its opening downwardly and is of about the same or slightly greater radius than is the second loop 8' and terminates in an extension 10' joining the inner end of this loop and extending downwardly and outwardly from the vehicle to lie on top of the chassis bar 1 thereof, where it is clamped by a clamping means made up of the U-bolt 14 with a yoke 15 and nuts 16 the same as that of the previous example. In this case the leaf 20' that has the eye 17 lies uppermost at the attachment to the chassis, and the second leaf 21' is intermediate, with the third leaf 22' thereunder next to the bar 1 and having the slot to form the recess 11' that receives the heads 12 and 13 on the bar 1.

Figure 2:
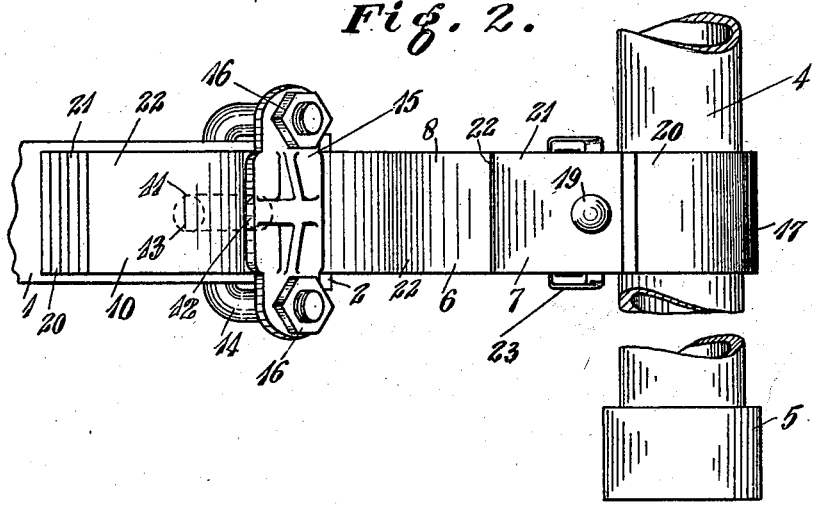
Fig. 2 is a partial plan view of the same.
Figure 3:
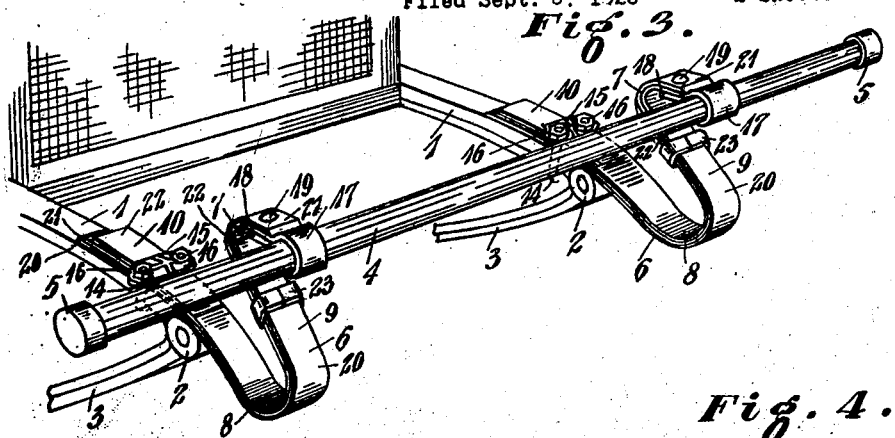
Fig. 3 is a general perspective view of the same on a reduced scale.

The three leaves 20', 21' and 22' are held together by the clip 23 secured by the bolt 24 to the third leaf 22', as in the first example; being located about the same distance from the upper outer end of the leaf 22'. A side view only of this modified support is shown, in Fig. 6, but it will be understood that this example would have almost the same appearance in plan view as is seen in the plan view of the first example in Fig. 2.

It will be noted that, in either example, the supports 6 or 6' hold the transverse member 4 some distance above the level of the chassis frame, and the loops 7 and 8 of the one, or loops 7, 8' and 8'' of the other, all incline inwardly upwardly toward the vehicle so that a line of direction of impact drawn from the member 4 to the region of attachment to the chassis frame bar 1 will cross each loop approximately at right angles to this inclined direction. This has the effect, due to the raised position of the member 4 which is to receive the impact, of transmitting the force of the impact downwardly to a decided degree upon the chassis; thereby imparting some of the force to the springs 3 of the vehicle. Also, due to the disposition of the loops as just described, the force is received by these loops in the most advantageous manner to insure maximum closure of the loops as distinguished from distortion of the loops or their connecting parts of the support along the lengths of the loops in such a manner that the material thereof presents greater resistance to the force and is more damaged by the impact than where the force acts throughout the curvature in any loop, with the side or junction portions as levers to transmit this action.

By having the support made up of a plurality of leaves, free to slide upon each other, as in principle is well known in laminated spring construction, the well known effect of this construction is obtained in conjunction with and modified by the multiple-looped formation and the above described advantageous disposition of the impact-receiving member 4 and of the loops of the support 6 or 6'.

With tangential disposition of the eye 17 to the first loop 7, with the lip 18 of the eye up inward from the member 4, near the top thereof and also nearly tangential to the cross-section of this member, the effect of an impact on the member 4 is to force the lip up and inward along the tangential junction part of the support inside the loop 7, which, combined with the binding action of the clamping bolt 19, results in a tightening of this eye 17 on the member 4, rather than a loosening of it at each impact. To keep the nut tight on this bolt 19, a lock washer 19' preferably is interposed between the nut and the lip 18 as seen in Fig. 1, as well as in Fig. 6. This bolt 19, by engaging with the end part of the second or intermediate leaf 21 or 21', firmly constrains it to the curvature of the main leaf 20 or 20' around the small loop 7; yet allows the slight relative movement of the leaves as is required in yielding to impact, since the slight clearance between the bolt 19 and the openings in the leaves through which it passes will be sufficient to permit this movement.

By having the extension 10 or 10' more curved than the vehicle part 1 initially, and forcing it into approximate conformity therewith by the action of the clamping U-bolt 14 or the like, the extension is caused to engage the part 1 very forcibly at the ends of its bearing on that part, where the greatest leverage to resist sidewise twisting is obtainable; and this, in conjunction with the engagement of the heads 12 and 13 in the recess 11 or 11', is adapted to afford a very secure attachment of the bumper to the vehicle, which I have found will not permit either endwise slippage or sidewise twisting of the supports from their correct positions on the bars 1, under impact of collision.

A further advantage is in the considerable up and down extent of the supports 6 or 6' below the member 4, where they are adapted to engage with a transverse bumper member on another vehicle, striking below the member 4; whereas, a bumper disposed almost wholly in a single horizontal plane would not function unless its transverse member, corresponding to the member 4 of my device, were engaged by the colliding object.

The support 6 having the single large loop 8 is deemed preferable, as it is lighter than the considerably greater length of material in the support 6' having the two large loops; and the single large loop 8 may be much larger, in the same bumper space, than either loop 8' or 8" of Fig. 6, and therefore more efficient in yielding to the impact without undue strain on the material. However, the second example, with smaller loops and long leverage involved in transmitting the strains thereto, with material for the spring leaves of ample resiliency, affords an effective transmission of the impact to the vehicle springs and absorption of a large proportion of this impact without permanent distortion of the bumper.

Further, it will be noted that, in either example, the attachment to the vehicle has its length at a substantial angle, almost a right angle, to the direction of transmission of impact before alluded to; so that the tendency to slip the supports lengthwise or sidewise out of their correct positions of the vehicle chassis bars 1 is minimized. This, together with the preferred flexure of the extensions 10 or 10' in clamping them, affords a vehicle attachment of exceptional firmness; whereas, in a bumper wherein the impacts are transmitted almost horizontally, the simple clamping of the supports down on the frame members would prove inadequate to resist the tendency of such impact directly to shift the supports along the frame members, so that in such devices usually rather more complicated attaching means must be resorted to.

Modifications other than those herein exemplified may occur in practice, in adapting my invention to different vehicles and under different conditions of use; and therefore I do not wish to be understood as being limited to the various details herein somewhat specifically described and illustrated, but having thus fully described my invention, as is required, what I claim as new and desire to secure by Letters Patent is:

1. In a motor-vehicle bumper, a transverse member, and resilient supports attached to said member and each extending down therefrom to the vehicle in a plurality of alternating loops, each loop inclining upwardly toward the vehicle.

2. In a motor-vehicle bumper, a transverse member, and multiple-leaf spring supports attached to said member and each extending down therefrom to the vehicle in a plurality of loops, each loop inclining upwardly toward the vehicle.

3. In a motor-vehicle bumper, a transverse member, and multiple-leaf spring supports each extending down from said member to the vehicle in a plurality of alternating loops, each loop inclining upwardly toward the vehicle, and one leaf of each support having an eye extending around said member, said eye having a lip lying inside the adjacent loop of the support, and clamping means engaging with this lip and with part of said adjacent loop.

4. In a motor-vehicle bumper, a transverse member, and resilient supports attached to said member and each extending down therefrom to the vehicle in a downwardly opening loop and a succeeding upwardly opening loop, each loop inclining upwardly toward the vehicle.

5. In a motor-vehicle bumper, a transverse member, and multiple-leaf spring supports attached to said member and each extending down therefrom to the vehicle in a downwardly opening loop and a succeeding upwardly opening loop, one of the leaves serving for the attachment to the transverse member, a second one of the leaves ending near said attachment, and a third one of the leaves ending near the inner side of the downwardly opening loop.

6. In a motor-vehicle bumper, a transverse member, and multiple-leaf spring supports attached to said member and each extending down therefrom to the vehicle in a downwardly opening loop and a succeeding upwardly opening loop, one of the leaves serving for the attachment to the transverse member, a second one of the leaves ending near said attachment, and a third one of said leaves ending near the inner side of the downwardly opening loop, and clips on the respective supports, attached to one of the leaves of the support and engaging another leaf thereof, to hold the leaves slidably together.

7. In a motor-vehicle bumper, a transverse member, and multiple-leaf spring supports attached to said member and extending therefrom to the vehicle in a plurality of loops.

8. In a motor-vehicle bumper, a transverse member, and resilient supports, each extending from said member to the vehicle with a loop whereby terminal parts of the supports are adapted to lie along certain surfaces of the vehicle, these terminal parts being curved relatively to said surfaces, and clamping means to clamp the respective terminal parts to the vehicle by reduction of the curvature of said terminal parts so that the tendency of these parts to resume their initial curvature exerts a tightening effect on said clamping means.

9. In a motor-vehicle bumper, a transverse member, resilient supports, each extending from said member to the vehicle with a loop whereby terminal parts of the supports are adapted to lie along certain surfaces of the vehicle having projections, each support having a recess to receive a respective projection and the terminal part of each support being curved relatively to the respective surfaces, and clamping means to clamp the respective terminal parts to the vehicle whereby said terminal parts are reduced in curvature so that the tendency of these parts to resume their original curvature exerts a tightening effect on said clamping means.

10. A resilient support for a motor-vehicle bumper having a plurality of loops and having at one end an integrally formed eye with a lip inside one of the loops.

WILLIAM RAHE.